United States Patent [19]

Osaki

[11] Patent Number: 4,865,242
[45] Date of Patent: Sep. 12, 1989

[54] CHAIN FEEDER FOR SLIDE FASTENER FINISHING MACHINES

[75] Inventor: Tatsuo Osaki, Uozu, Japan

[73] Assignee: Yoshida Kogyo K. K., Tokyo, Japan

[21] Appl. No.: 184,896

[22] Filed: Apr. 22, 1988

[30] Foreign Application Priority Data

Apr. 25, 1987 [JP] Japan ................... 62-102812

[51] Int. Cl.⁴ ............................................. B65H 20/04
[52] U.S. Cl. ..................... 226/181; 226/152; 226/154
[58] Field of Search ............... 226/152, 154, 155, 181; 29/33.2, 408; 188/72.7, 77 W

[56] References Cited

U.S. PATENT DOCUMENTS

| 4,217,685 | 8/1980 | Seki ........................................... 29/408 |
| 4,265,014 | 5/1981 | Yoshieda et al. .................. 29/408 X |
| 4,561,161 | 12/1985 | Morita ........................... 29/33.2 X |

FOREIGN PATENT DOCUMENTS 0141280  5/1985  European Pat. Off.

*Primary Examiner*—Daniel P. Stodola
*Assistant Examiner*—Phillip S. Han
*Attorney, Agent, or Firm*—Hill, Van Santen, Steadman & Simpson

[57] ABSTRACT

A chain feeder for used in a slide fastener finishing machine includes feed roller mounted on a driven shaft driven to rotate in one direction via a clutch and a spring-biased brake lever mounted on the driven shaft via a one-way clutch for exerting a braking force to the driven shaft when the feed roller is rotated in the opposite direction. With this chain feeder thus constructed, the fastener chain is held taut during the time top stops are applied to the fastener chain.

2 Claims, 3 Drawing Sheets

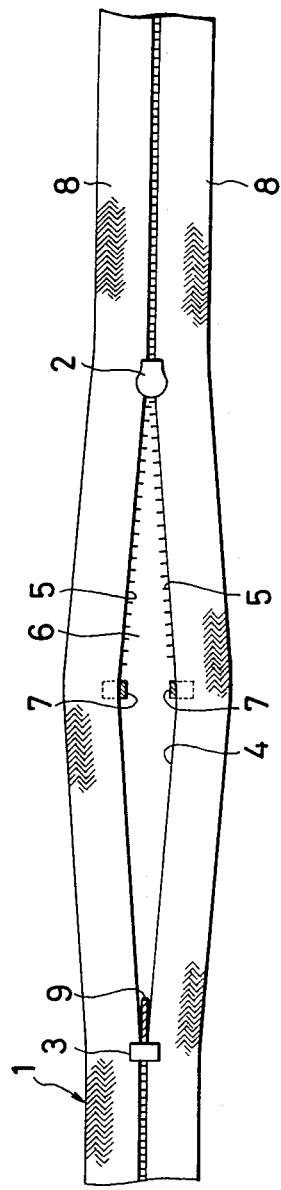
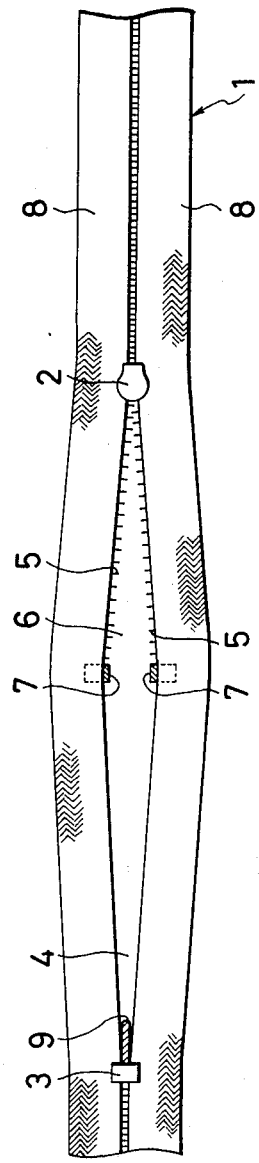
FIG.3
FIG.4

CHAIN FEEDER FOR SLIDE FASTENER FINISHING MACHINES

BACKGROUND OF THE INVENTION

1. Field of the Invention

The present invention relates generally to a machine for finishing or processing a continuous slide fastener chain into slide fasteners of individual product lengths as the fastener chain is longitudinally fed along a path, and more particularly to a chain feeder incorporated in such fastener finishing machine for feeding the fastener chain under predetermined conditions.

2. Description of the Prior Art

There are known slide fastener finishing or processing machines wherein a continuous slide fastener chain (hereinafter referred to as "chain"), as it is fed longitudinally, is processed into slide fasteners of individual product lengths through a succession of steps, such as slider application, bottom stop application, top stop application and chain severing. The known top stop application step is performed by placing a film of synthetic resin on one surface of the chain and then shaping the synthetic resin film into a top stop fused to the chain by ultrasonic welding or high frequency welding. The top stop thus applied shows an insufficient bonding strength against peeling and involves formation of harmfull burrs around the top stop.

With the foregoing drawbacks in view, there has been proposed a somewhat successful top stop application step in which a top stop of U-shaped configuration is disposed on each of two companion stringer tapes astride an inner longitudinal edge thereof, and upper and lower wings of the U-shaped top stop are then fused together through an aperture in the stringer tape. In this proposed step, the longitudinal feed of the chain by feed rollers is temporarily interrupted and the chain is held taut. While keeping this condition, two top stops held in horizontal U-shape posture with their open ends facing outwardly are forced into an opening in the chain to spread the stringer tapes apart until the open ends of the U-shaped top stops are in alignment with inner longitudinal edges of the stringer tapes whereupon the longitudinal tape edges are snugged into the top stops as the chain is tensioned. The top stops are then fused to the respective stringer tapes by ultrasonic welding or high frequency welding.

The foregoing top stop application step is still unsatisfactory for its low accuracy in positioning of the top stops relative to the chain. It is therefore desirous to devise a chain feeder capable of performing dual functions (one for feeding the chain, the other for holding the chain under tension).

SUMMARY OF THE INVENTION

With the foregoing difficulties of the prior art in view, it is the primary object of the present invention to provide a chain feeder for a slide fastener finishing machine which enable an accurate application of top end stops to a slide fastener chain.

Another object of the present invention is to provide a chain feeder for use in a slide fastener finishing machine, which chain feeder is simple in construction and is capable of performing dual functions, one for feeding a chain and the other for holding the chain under tension.

According to the present invention, the foregoing and other objects are attained by a chain feeder for a slide fastener finishing machine, comprising: a feed roller and a presser roller coacting with the feed roller for feeding a slide fastener chain along a path, the feed roller being fixedly mounted on a driven shaft for corotation therewith; drive means connected with the driven shaft via a clutch for rotating the driven shaft and the feed roller in o direction; a brake lever mounted on the driven shaft via a one-way clutch for rotation with the driven shaft only when the driven shaft and the feed roller are rotated in the other direction while the clutch is disengaged; and spring means for urging the brake lever to rotate in said one direction.

BRIEF DESCRIPTION OF THE DRAWINGS

FIGS. 3 and 4 are plan views illustrative of the manner in which top stops are applied to a continuous slide fastener chain.

Figure 1:
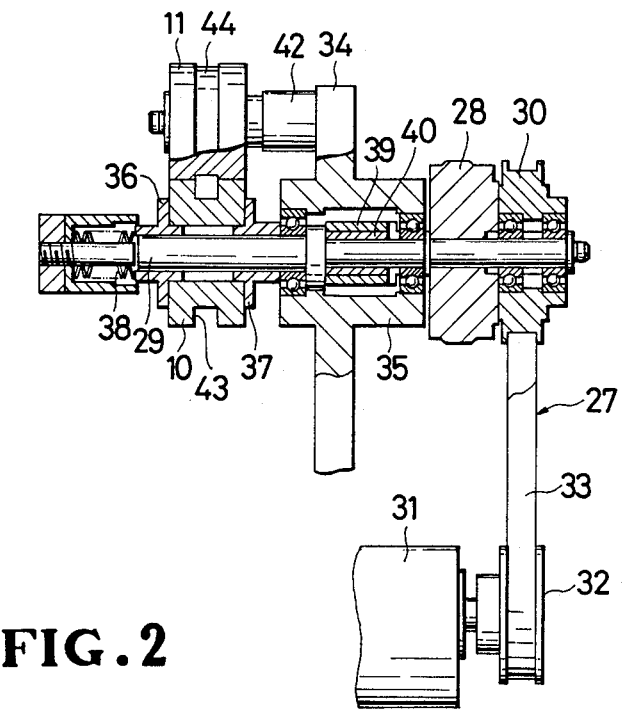
FIG. 1 is a longitudinal cross-sectional view of a chain feeder embodying the present invention.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

FIGS. 3 and 4 show a continuous slide fastener chain 1 as it is subjected to a top stop application step on a slide fastener finishing machine in which a chain feeder of the present invention is incorporated. In the preceding steps, a slider 2 and a bottom stop 3 have been applied to the fastener chain 1. In this top stop application step, the fastener chain 1 is partly spread to provide a substantially triangular element-free space or gap 4 extending between the bottom stop 3 and a rearward end (leftward end in these figures) of a pair of rows of coupling elements 5, and a substantially triangular disengaged end portion 6 of the coupling elements 5 extending contiguously from the element-free space 4 to the slider 2. A pair of U-shaped top stops 7, 7 of synthetic resin is then placed in the spread portion of the fastener chain 1 while opposed inner longitudinal edges of two companion stringer tapes 8, 8 are disposed in the U-shaped top stops 7, 7. A chain stopper 9 which is projected in the element-free space 4 is slightly moved forwardly (rightwards in these FIGS.) by the bottom stop 3 as the fastener chain 1 is advanced. Then the forward movement of the fastener chain 1 is temporarily interrupted and the chain stopper 9 is moved rearwardly until predetermined portions on the respective stringer tapes 8, 8 are brought into register with the top stops 7, 7. Finally, the top stops 7 are applied by fusing to the stringer tapes 8, 8.

Figure 5:
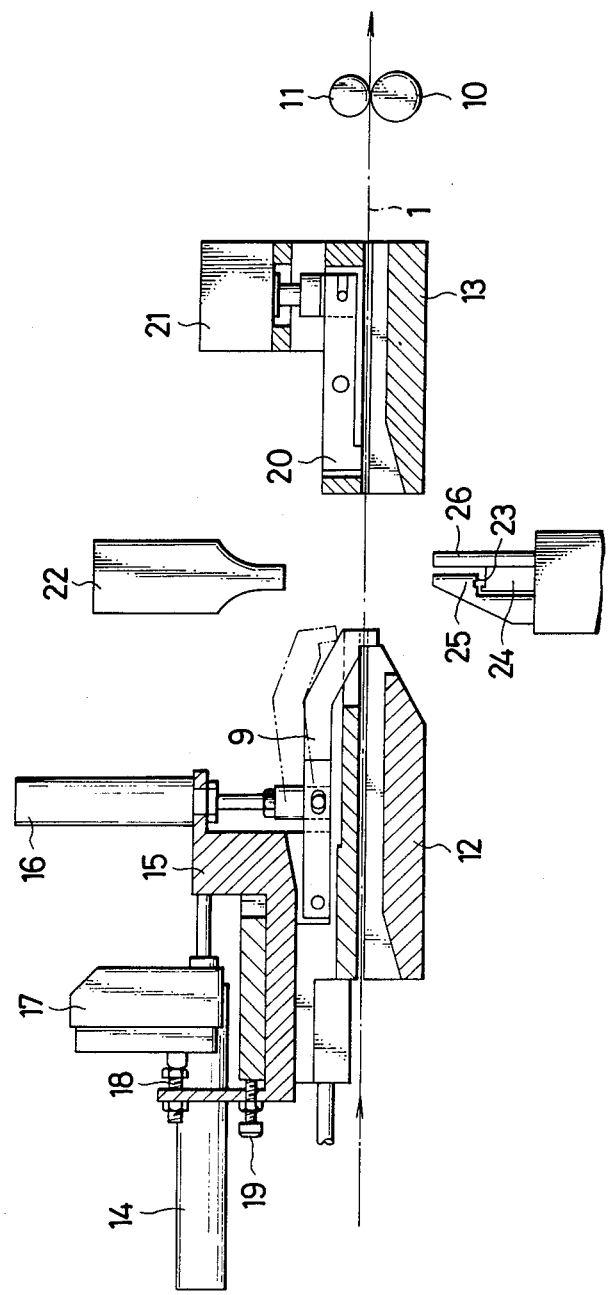
FIG. 5 is a longitudinal cross-sectional view of a portion of a slide fastener finishing machine incorporating the chain feeder of the invention.

The foregoing top stop application step is performed by the slide fastener finishing machine shown in FIG. 5. The machine includes a chain feeder including a feed roller 10 and a presser roller 11 coacting with the feed roller 10 for feeding the fastener chain 1, a top stop applicator 22–26 disposed upstream of the chain feeder, and a pair of chain guides 12, 13 disposed, respectively, upstream and downstream of the top stop applicator 22–26.

The chain guide 12 includes a holder 15 connected with and driven by a horizontal first fluid cylinder 14 for reciprocating movement along a horizontal path of movement of the fastener chain 1. The holder 15 supports thereon a vertical second fluid cylinder 16 connected with the chain stopper 9 which is pivotally connected at its one end to the holder 15. The chain stopper 9 is vertically angularly movable into and out of the element-free space 4 (FIGS. 3 and 4) in response to the operation of the second fluid cylinder 16. A limit switch 17 is secured to a body of the chain guide 12 and has an actuator (not designated) engageable with a dog 18 mounted on the holder 15 when the chain stopper 9 and hence the holder 15 has advanced through a predetermined distance after engagement of the chain stopper 9 with the bottom stop 3 (FIGS. 3 and 4). Upon engagement with the dog 18, the limit switch 17 issues an electric signal to the chain feeder for stopping positive rotation of the feed roller 10 in one direction. The electric signal is also delivered to the first fluid cylinder 14 whereupon the fluid cylinder 14 retracts its piston rod to move the holder 15 and hence the chain stopper 9 rearwardly, thereby retracting the fastener chain 1. Designated at 19 is a stopper screw for adjustably limiting the extent of forward movement of the fastener chain 1.

The chain guide 13 includes a presser lever pivotally movable in a vertical plane for depressing the fastener chain 1, and a vertical third fluid cylinder 21 for vertically reciprocating the presser lever 20.

The top stop applicator includes a ultrasonic horn 22 disposed above the path of movement of the fastener chain 1 and an anvil 23 disposed below the path in alignment with the horn 22, the horn 22 and the anvil 24 being vertically movable toward and away from each other. The top stop applicator further includes an inverted L-shaped jaw 25 disposed on one side of the anvil 24 and overlying the anvil 24 so as to define therebetween a pair of juxtaposed pockets 23 for receiving therein top end stops, respectively. The upper jaw 25 is vertically movable together with the anvil 24 and also pivotally movable about its lower end to open and close the pockets 23. The jaw 25 is upwardly tapered as viewed from the path so that the fastener chain 1 is spreaded by the jaw 25 as the latter is projected into the element-free space 4 together with the anvil 24. An upwardly tapered wedge member 26 is disposed on the other side of the anvil 24 and vertically movable to further spread the disengaged end portion of the coupling elements 5 after the top stops 7 are attached to the stringer tapes 8.

Figure 2:
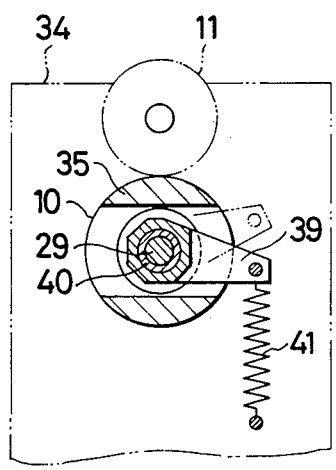
FIG. 2 is a transverse cross-sectional view of the chain feeder, showing a brake lever and related parts.

As shown in FIGS. 1 and 2, the feed roller 10 and the presser roller 11 jointly constitute a part of the chain feeder of the present invention. The chain feeder is constructed such that the feed roller 10 is driven to rotate in one direction to feed the fastener chain 1 forwardly, then the feed roller 10 is disconnected from a drive means to stop forward feeding of the fastener chain 1, and thereafter, the feed roller 10 is rotated in the other direction against a bias or braking force then the fastener chain 1 is moved rearwardly by the chain stopper 9.

To this end, the chain feeder further has a drive means or mechanism 27 connected to a driven shaft 29 with a clutch 28. The drive mechanism 27 includes a driven pulley 20 rotatably mounted on the driven shaft 29, an endless belt 33 running around the driven pulley 30 and a drive pulley 32 secured to a drive shaft of a motor 31 The clutch 28 releaseably connects the driven pulley 30 and the driven shaft 29. The clutch 28 is engaged to connect the driven shaft 29 with the drive mechanism 27 for rotating the feed roller 10 in said one direction, the clutch 28 being disengaged upon receipt of an electric signal from the limit switch 17 (FIG. 5). The driven shaft 29 is rotatably supported by a tubular bearing portion 35 of a vertical frame 34. A pair of flanged collars 36, 37 is fitted over the driven shaft 29 with the feed roller 10 sandwiched therebetween. A series of coned disc springs 38 are disposed around an end of the driven shaft 29 and act on the collar 36 to urge the latter against the feed roller 10 which in turn is urged against the collar 37, thereby firmly gripping the feed roller 10 between the collars 36, 37. The bearing portion 35 is longitudinally grooved as shown in FIG. 2 and houses therein a brake lever 39. The brake lever 39 is mounted on the driven shaft 29 via a one-way clutch 40 for rotation with the driven shaft 29 only when the feed roller 10 and hence the drive shaft 29 is rotated in the opposite direction while the clutch 28 is disengaged. When the driven shaft 29 and the feed roller 10 are driven by the drive mechanism 27 to rotate in said one direction, the one-way clutch 40 rotates freely so that the brake lever 39 is disconnected from the driven shaft 29. The brake lever 39 partly project outwardly from the tubular bearing portion 35 as shown in FIG. 2 and is normally urged in said one direction by means of a tension spring 41 extending between a free end of the brake lever 39 and the frame 34. With the spring-biased brake lever 39 thus provided, a continuous braking force is applied to the driven shaft 29 with the result that the fastener chain 1 can be fed rearwardly without slacking between the chain stopper 9 and the feed roller 10.

The presser roller 11 is rotatably mounted on a horizontal shaft 42 secured to the frame 34. The feed and presser rollers 10, 11 have central peripheral grooves 43, 44, respectively, for the passage of the coupling elements 5.

In operation, when the fastener chain 1 is to be fed forwardly, the clutch 28 is engaged to connect the drive mechanism 27 with the driven shaft 29 for rotating the driven shaft 29 and the feed roller 10 in one direction. A further advancing movement of the fastener chain 1 causes the bottom stop 3 to engage the chain stopper 9 and then move the latter forwardly. When the chain stopper 1 has advanced through a predetermined distance, the limit switch 17 is activated by the dog 18 on the holder 15, whereupon the limit switch 17 issues an electric signal to disconnect the clutch 28. Thus the forward movement of the fastener chain 1 is stopped. Then the chain stopper 9 is retracted to move the fastener chain 1 rearwardly during which time the feed roller 10 is rotated in opposite direction against the bias of the tension spring 41. Owing to this braking force applied from the spring-biased brake-lever 39 to the driven shaft 29, the fastener chain 1 is held taut between the chain stopper 9 and the chain feeder. With the fastener chain 1 thus tensioned, the top stops 7 can be accurately applied to the respective stringer tapes 8.

Obviously, various modifications and variations of the present invention are possible in the light of the above teaching. It is therefore to be understood that within the scope of the appended claims the invention may be practiced otherwise than as specifically described.

What is claimed is:

1. A chain feeder for a slide fastener finishing machine, comprising:
    (a) a feed roller and a presser roller coacting with said feed roller for feeding a slide fastener chain along a path, said feed roller being fixedly mounted on a driven shaft for corotation therewith;
    (b) drive means operatively connected with said driven shaft for rotating said driven shaft and said feed roller in one direction;
    (c) a first clutch acting between said drive means and said driven shaft for releasably connecting them, said clutch, when engaged, being operative to interconnect said drive means and said driven shaft;
    (d) a brake lever operatively connected with said driven shaft;
    (e) a one-way clutch acting between said brake level and said driven shaft for releasably connecting them, said one-way clutch being freely rotatable while said driven shaft is rotating in said one direction, said one-way clutch being operative to interconnect said brake level and said driven shaft only when said driven shaft and said feed roller are rotated in the other direction while said first clutch is disengaged; and
    (f) spring means for urging said brake level to rotate in said one direction.

2. A chain feeder according to claim 1, further including a frame having a tubular bearing portion, said driven shaft being rotatably supported by said tubular bearing portion, said one-way clutch being housed in said tubular bearing portion, said tubular bearing portion having a longitudinal grooved, said brake lever projecting outwardly from said grooved tubular bearing portion, said spring means comprising a tension spring acting between a free end of said brake lever and said frame.

* * * * *